(12) United States Patent
Heap et al.

(10) Patent No.: US 8,296,027 B2
(45) Date of Patent: Oct. 23, 2012

(54) METHOD AND APPARATUS TO CONTROL OFF-GOING CLUTCH TORQUE DURING TORQUE PHASE FOR A HYBRID POWERTRAIN SYSTEM

(75) Inventors: Anthony H. Heap, Ann Arbor, MI (US); Lawrence A. Kaminsky, Sterling Heights, MI (US); Jy-Jen F. Sah, West Bloomfield, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 757 days.

(21) Appl. No.: 12/248,199

(22) Filed: Oct. 9, 2008

(65) Prior Publication Data

US 2009/0112419 A1 Apr. 30, 2009

Related U.S. Application Data

(60) Provisional application No. 60/982,463, filed on Oct. 25, 2007.

(51) Int. Cl.
*G06F 7/00* (2006.01)
(52) U.S. Cl. ....... 701/67; 701/68; 903/912; 180/65.275; 475/269
(58) Field of Classification Search ............ 701/51, 701/55, 67, 68; 180/65.275; 903/912, 914, 903/917; 475/269
See application file for complete search history.

(56) References Cited

U.S. PATENT DOCUMENTS

| | | | |
|---|---|---|---|
| 6,364,807 B1 * | 4/2002 | Koneda et al. ............. | 477/5 |
| 6,832,148 B1 | 12/2004 | Bennett | |
| 6,868,318 B1 | 3/2005 | Cawthorne | |
| 7,154,236 B1 | 12/2006 | Heap | |
| 7,474,012 B2 * | 1/2009 | Tabata et al. ............. | 290/40 C |
| 7,549,944 B2 * | 6/2009 | Tabata et al. ............. | 477/5 |
| 2004/0049328 A1 | 3/2004 | Lee | |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |

(Continued)

FOREIGN PATENT DOCUMENTS

EP 1710462 A1 10/2006

*Primary Examiner* — Mark Hellner

(57) ABSTRACT

A method for controlling an electro-mechanical transmission through an unlocking state of a clutch, the transmission mechanically-operatively coupled to an internal combustion engine and an electric machine adapted to selectively transmit mechanical power to an output member includes decreasing a reactive torque acting upon the clutch, including overriding torque commands to the engine and to the electric machine, and simultaneously decreasing a clutch torque capacity, including, during a lead period selected according to an engine command reaction time, commanding an intermediate clutch torque command maintaining sufficient clutch torque capacity to exceed an initial reactive torque calculated at an initiation of the unlocking state, and following the lead period, decreasing through a ramp down the clutch torque capacity, maintaining sufficient clutch torque capacity to exceed the decreasing reactive torque.

16 Claims, 9 Drawing Sheets

U.S. PATENT DOCUMENTS

| | | |
|---|---|---|
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0026898 A1* | 1/2008 | Supina et al. .................. 475/5 |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0011887 A1* | 1/2009 | Komada et al. .................. 475/5 |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |

| | | |
|---|---|---|
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

* cited by examiner

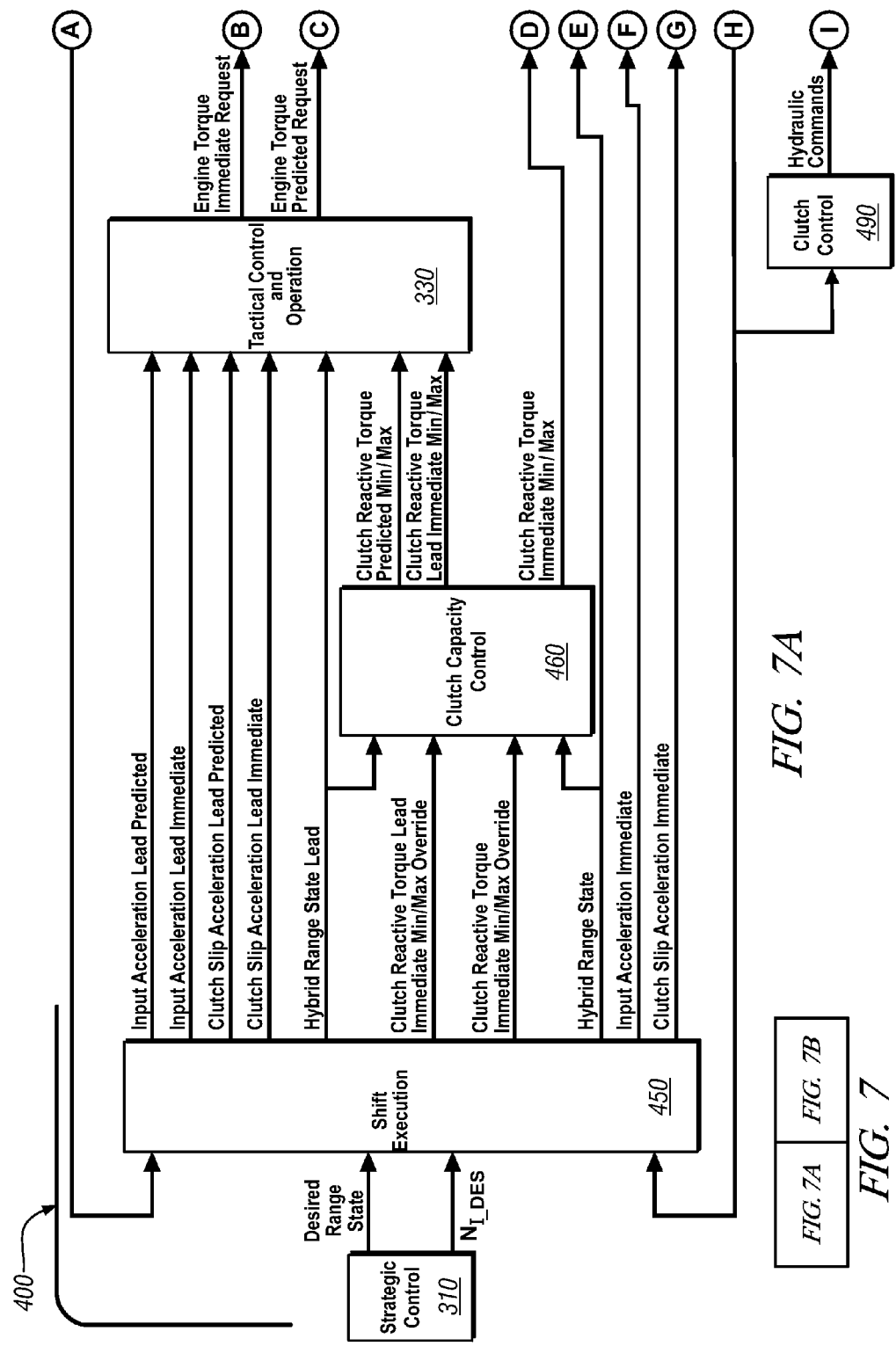

METHOD AND APPARATUS TO CONTROL OFF-GOING CLUTCH TORQUE DURING TORQUE PHASE FOR A HYBRID POWERTRAIN SYSTEM

CROSS REFERENCE TO RELATED APPLICATIONS

This application claims the benefit of U.S. Provisional Application No. 60/982,463 filed on Oct. 25, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

Operation of the above devices within a hybrid drive vehicle require management of numerous torque bearing shafts or devices representing connections to the above mentioned engine, electrical machines, and driveline through an output shaft. Various control schemes and operational connections between the various aforementioned components of the hybrid drive system are known, and the control system must be able to engage and disengage the various components in order to perform the functions of the hybrid drive system. Engagement and disengagement are known to be accomplished through the use of a transmission employing clutches. Clutches are devices well known in the art for engaging and disengaging shafts including the management of rotational velocity and torque differences between the shafts. Engagement or locking, disengagement or unlocking, and operation while engaged or locked operation are all transmission states that must be managed in order for the vehicle to operate properly and smoothly. These implications to vehicle operation are collectively described as part of a vehicle characteristic called drivability.

Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying a hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged and desynchronized, to synchronized with no clamping force applied, to engaged but with only minimal clamping force, to engaged with some maximum clamping force. Clamping force applied to the clutch determines how much reactive torque the clutch can carry before the clutch slips. Clutches can be designed to operate with some level of controlled slip in asynchronous operation, or clutches can be designed to operate with little or preferably no slip in synchronous operation. This disclosure deals with clutches designed primarily for synchronous operation. Variable control of clutches through modulation of clamping force allows for transition between locked and unlocked states and further allows for managing slip in a locked transmission. In addition, the maximum clamping force capable of being applied by the hydraulic lines can also vary with vehicle operating states and can be modulated based upon control strategies.

Slip, or relative rotational movement between the connective surfaces of the clutch, occurs whenever the reactive torque transmitted through the clutch exceeds the actual torque capacity created by the applied clamping force. Clutches can be asynchronous, designed to accommodate slip, or clutches can be synchronous, designed to operate with little or no slip. This disclosure is related primarily to synchronous clutches. Slip in a transmission in synchronous operation results in unintended loss of control within the transmission and adverse affects to drivability.

Transitioning from a locked to an unlocked state requires a transitional unlocking state, through which a clutch begins in a locked, synchronized state with connective surfaces clamped together and ends in an unlocked, substantially separated state with no reactive torque being transferred or carried across the clutch. Clamping force applied by a clutch control system transitions in the unlocking state from a clamping force sufficient to transfer a demanded torque across the clutch without slip to a fully released clamping force, sufficiently lowered to create an unlocked state. Orderly release of the clamping force through the unlocking state, facilitating optimal drivability of the vehicle, can be difficult to achieve. As described above, whenever the reactive torque transmitted through the clutch exceeds the actual clutch capacity created by the applied clamping force, slip occurs. Because unlocking necessarily involves a rapid decrease in clamping force, engine and electric machine torques creating too much reactive torque across a clutch during an unlocking event create risk to drivability as potential slip.

SUMMARY

A method for controlling an electro-mechanical transmission through an unlocking state of a clutch, the transmission mechanically-operatively coupled to an internal combustion engine and an electric machine adapted to selectively transmit mechanical power to an output member includes decreasing a reactive torque acting upon the clutch, where decreasing the reactive torque includes overriding torque commands to the engine and to the electric machine, and simultaneously decreasing a clutch torque capacity, wherein decreasing the clutch torque capacity includes, during a lead period selected according to an engine command reaction time, commanding an intermediate clutch torque command maintaining sufficient clutch torque capacity to exceed an initial reactive torque calculated at an initiation of the unlocking state, and in a second period following the lead period, progressively decreasing through a ramp down the clutch torque capacity, maintaining sufficient clutch torque capacity to exceed the decreasing reactive torque.

BRIEF DESCRIPTION OF THE DRAWINGS

One or more embodiments will now be described, by way of example, with reference to the accompanying drawings, in which.

DETAILED DESCRIPTION

Figure 1:
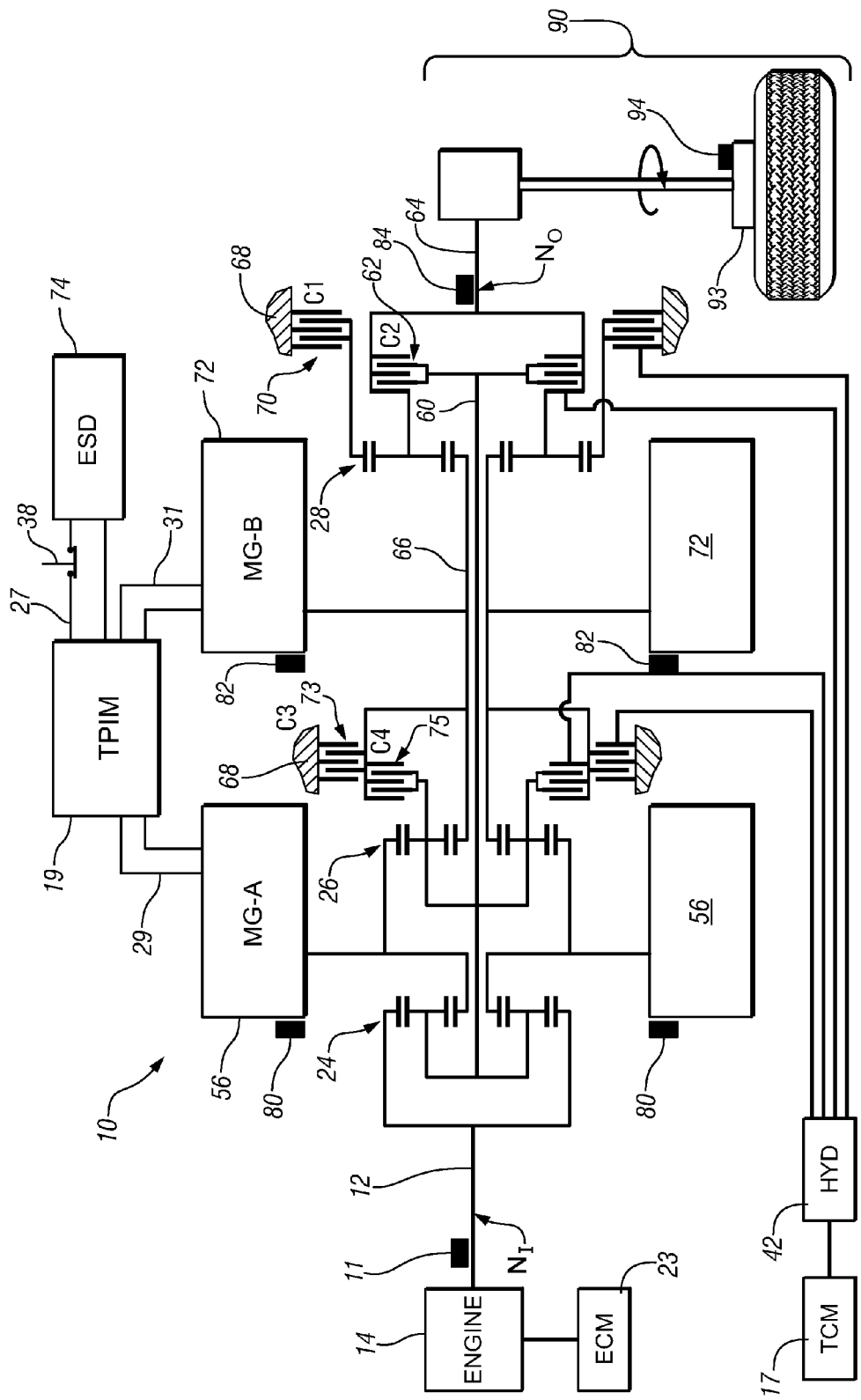
FIG. 1 is a schematic diagram of an exemplary powertrain, in accordance with the present disclosure.
Figure 2:
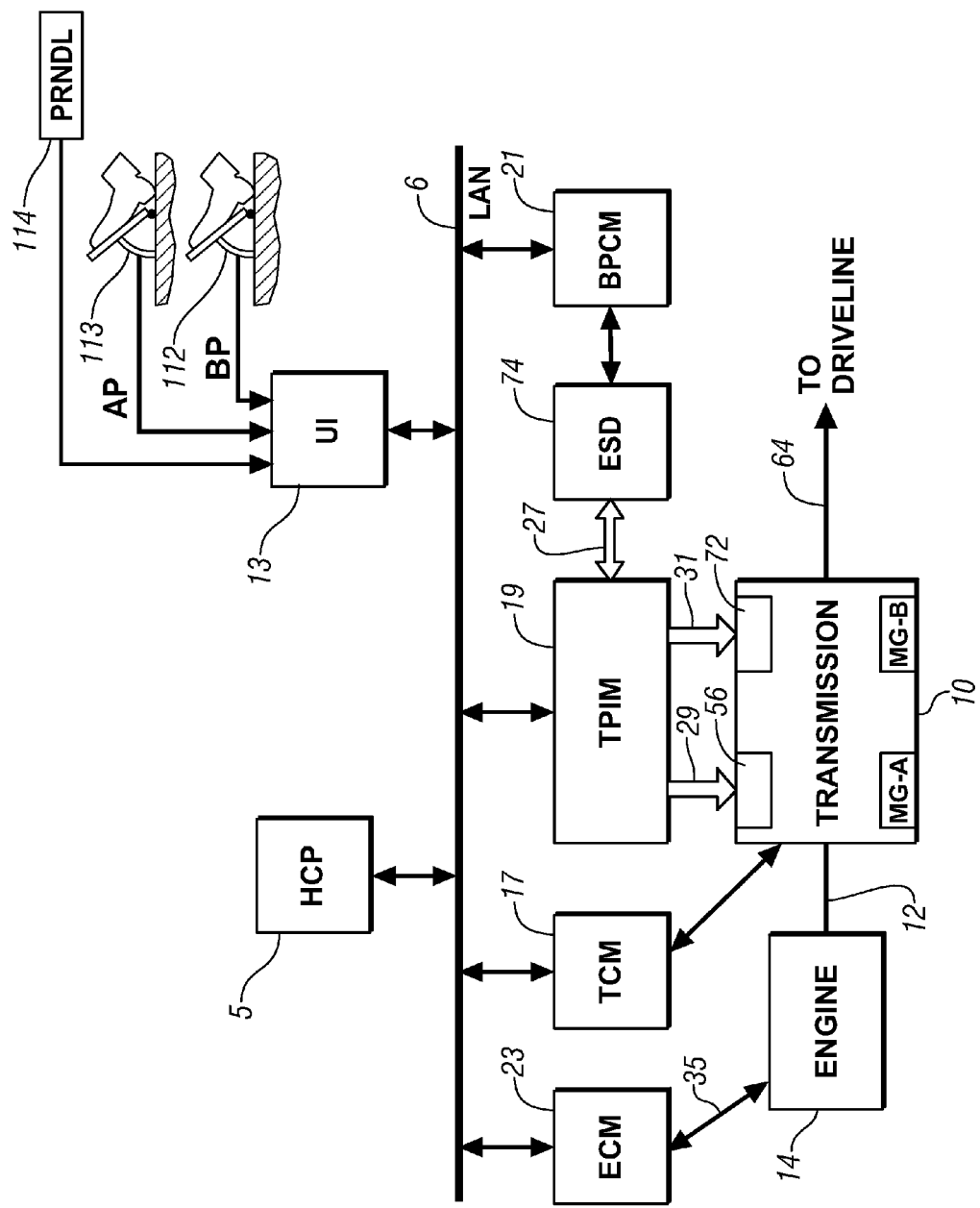
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engagable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
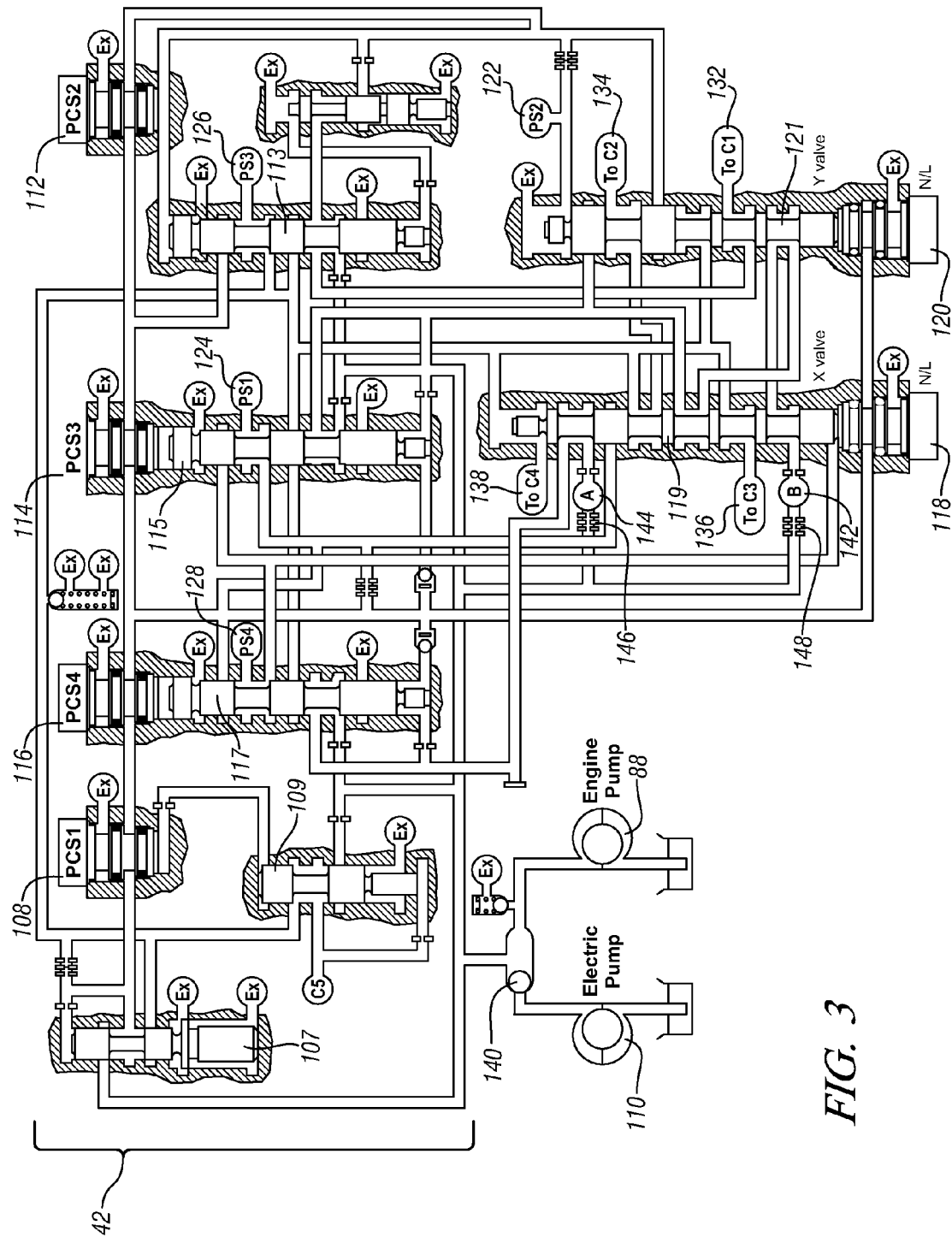
FIG. 3 is a schematic diagram of a hydraulic circuit, in accordance with the present disclosure.

FIG. 3 depicts a schematic diagram of the hydraulic circuit 42 for controlling flow of hydraulic fluid in the exemplary transmission. A main hydraulic pump 88 is driven off the input shaft 12 from the engine 14, and an auxiliary pump 110 controlled by the TPIM 19 to provide pressurized fluid to the hydraulic circuit 42 through valve 140. The auxiliary pump 110 preferably comprises an electrically-powered pump of an appropriate size and capacity to provide sufficient flow of pressurized hydraulic fluid into the hydraulic circuit 42 when operational. The hydraulic circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising variable pressure control solenoids ('PCS') PCS1 108, PCS2 114, PCS3 112, PCS4 116 and solenoid-controlled flow management valves, X-valve 119 and Y-valve 121. The hydraulic circuit 42 is fluidly connected to pressure switches PS1, PS2, PS3, and PS4 via passages 122, 124, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic circuit 42 over a range of pressures and may provide additional functionality for the hydraulic circuit 42. Pressure control solenoid PCS3 112 has a control position of normally high, and is fluidly connected to spool valve 113 and operative to effect flow therethrough when actuated. Spool valve 113 is fluidly connected to pressure switch PS3 via passage 126. Pressure control solenoid PCS2 114 has a control position of normally high, and is fluidly connected to spool valve 115 and operative to effect flow therethrough when actuated. Spool valve 115 is fluidly connected to pressure switch PS2 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS1 via passage 122.

The hydraulic circuit 42 includes a base cooling circuit for providing hydraulic fluid to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 114, PCS3 112 and PCS4 116 and solenoid-controlled flow management valves X-valve 119 and Y-valve 121, which leads to flow of hydraulic fluid around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first continuously variable mode and the first and second fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic fluid to actuate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

As mentioned above, clutch slip is an event which occurs when the load or reactive torque applied across a clutch exceeds an actual torque capacity of the clutch. The torque applied overcomes static frictional forces between the connective surfaces of the clutch, and the connective surfaces rotate relative to each other. During an unlocking event, clamping force is necessarily transitioned rapidly from a high clamping force, at least sufficient to maintain the previous locked state, to a low or null clamping force sufficient to create an unlocked state. Through the same unlocking event, created by a controlled change in clutch state, the reactive torque must be rapidly decreased to avoid slip. Slip created in an unlocking event creates variability it the torque transmitted through the transitioning clutch and can also create variability in the torque transmitted through other clutches in the vehicle. These variations in torque, particularly in a transmission designed for synchronous operation, can cause occupants of the vehicle to perceive a bump or a jerking motion in the transition, and therefore negatively impacting drivability. A method is disclosed to prevent slip within a clutch in an unlocking state by imposing torque constraints upon the engine and electrical machines applying torque to the clutch, thereby progressively eliminating applied reactive torque, and simultaneously maintaining torque capacity of the clutch in excess of the torque constraints throughout the unlocking state.

As is known by one having ordinary skill in the art, any control system includes a reaction time. Changes to a powertrain operating point, comprising the speeds and torques of the various components to the powertrain required to achieve the desired vehicle operation, are driven by changes in control signals. These control signal changes act upon the various components to the powertrain and create reactions in each according to their respective reaction times. Applied to a hybrid powertrain, any change in control signals indicating a new torque request, for instance, as driven by a change in operator torque request or as required to execute a transmission shift, creates reactions in each affected torque generating device in order to execute the required changes to respective input torques. Changes to input torque supplied from an engine are controlled by an engine torque request setting the torque generated by the engine, as controlled, for example, through an ECM. Reaction time within an engine to changes in torque request to an engine is impacted by a number of factors well known in the art, and the particulars of a change to engine operation depend heavily on the particulars of the engine employed and the mode or modes of combustion being utilized. In many circumstances, the reaction time of an engine to changes in torque request will be the longest reaction time of the components to the hybrid drive system. Reaction time within an electric machine to changes in torque request include time to activate any necessary switches, relays, or other controls and time to energize or de-energize the electric machine with the change in applied electrical power.

Figure 4:
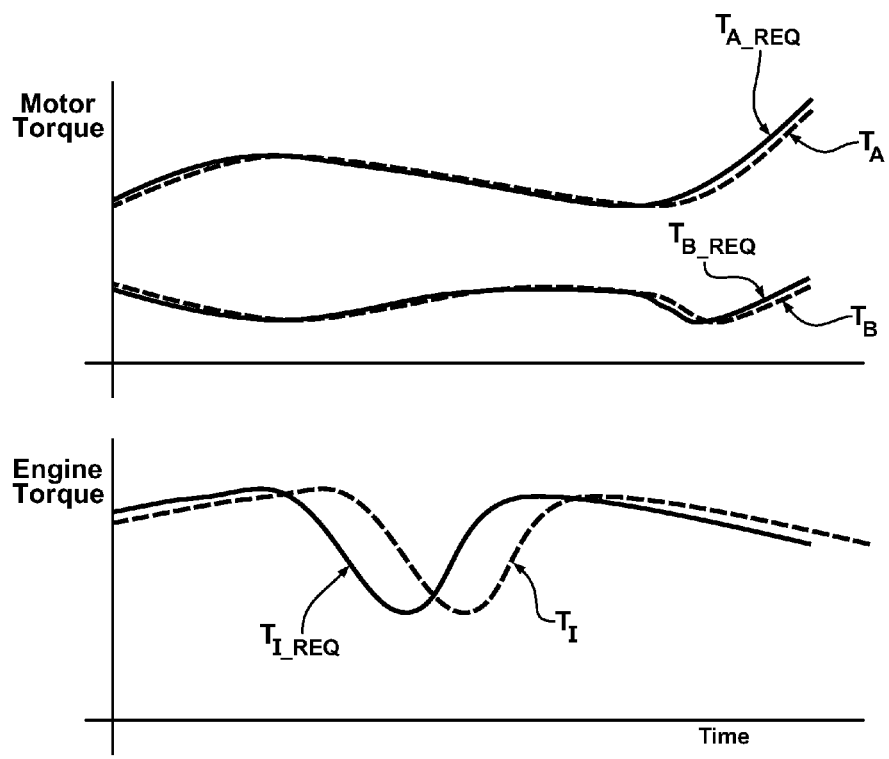
FIG. 4 graphically depicts reaction times of exemplary hybrid powertrain components to changes in torque request, in accordance with the present disclosure.

FIG. 4 graphically depicts reaction times of exemplary hybrid powertrain components to changes in torque request, in accordance with the present disclosure. Components to an exemplary hybrid powertrain system including an engine and two electric machines are exemplified. Torque requests and resulting changes in input torque produced by each torque generating device are illustrated. As described above, the data shows that electric machines quickly respond to changes in torque requests, whereas the engine follows changes in torque requests more slowly.

A method is disclosed wherein reactions times of the engine and of the electric machine or machines within a hybrid powertrain are utilized to control in parallel a lead immediate torque request, controlling the engine, and an immediate torque request, controlling the electric machines, the torque requests being coordinated by respective reaction times in order to substantially effect simultaneous changes to input torque.

Because, as discussed above, changes to input torque from the engine are known to involve consistently longer reactions times than changes to input torque from an electric machine, an exemplary embodiment of the disclosed method can implement changes in torque request to the engine and the electric machine, acting in parallel as described above, including a lead period to the more quickly reacting device, the electric motor. This lead period may be developed experimentally, empirically, predictively, through modeling or other techniques adequate to accurately predict engine and electric machine operation, and a multitude of lead periods might be used by the same hybrid powertrain, depending upon different engine settings, conditions, operating and ranges and vehicle conditions. An exemplary equation that can be used in conjunction with test data or estimates of device reaction times to calculate lead period in accordance with the present disclosure includes the following relationship.

$$T_{Lead} = T_{Lead\ Reaction} - T_{Immediate\ Reaction} \qquad [1]$$

$T_{Lead}$ equals the lead period for use in methods described herein. This equation assumes that two torque producing devices are utilized. $T_{Lead\ Reaction}$ represents the reaction time of the device with the longer reaction time, and $T_{Immediate\ Reaction}$ represents the reaction time of the device with the shorter reaction time. If a different system is utilized, comprising for example, an engine with a long lead period, a first electric machine with an intermediate lead period, and a second electric machine with a short lead period, lead periods can be developed comparing all of the torque generating devices. In this exemplary system, if all three torque generating devices are involved, two lead periods, one for the engine as compared to each of the electric machines, will be utilized to synchronize the responses in each of the devices. The same system at a different time might be operating with the engine off and disengaged from the transmission, and a lead period comparing the first electric machine and the second electric machine will be utilized to synchronize the responses in the two electric machines. In this way, a lead period can be developed coordinating reaction times between various torque generating devices can be developed.

One exemplary method to utilize lead periods to implement parallel torque requests to distinct torque generating devices in order to effect substantially simultaneous changes to output torque in response to a change in operator torque request includes issuing substantially immediately a change to the engine torque immediate request, initiating within the engine a change to a new engine output torque. This new engine output torque, in conjunction with the electric motor operating state, is still managed by the HCP in order to provide some portion of the total input torque to the transmission required to propel the vehicle. From the point that the engine torque immediate request changes, the lead period expires, described above taking into account the differences in reaction times between the engine and the electric machine. After the lead period, a change to torque requests issued to the electric machine or machines, managed by the HCP in order to fulfill a portion of the operator torque request, is executed, and the electric machine changes the electric machine operating state, and as described above, the changes to the input torques provided by the engine and the electric machine change substantially contemporaneously.

As described in the disclosed method above, engine torque immediate requests and torque requests to an electric machine are disclosed for use in parallel to control distinct torque generative devices with different reaction times to reaction to changes in operator torque request. Changes in operator torque request can include a simple change in desired output torque within a particular transmission operating range state, or changes in operator torque request can be required in conjunction with a transmission shift between different operating range states. Changes to operator torque requests in conjunction with a transmission shift are more complex than changes contained within a single operating range state because torques and shaft speeds of the various hybrid powertrain components must be managed in order to transition torque applied from a first clutch and to a second previously not applied clutch without the occurrence of slip, as described above.

An unlocking state, requiring controlled reactions within the clutch as a reduction in clamping force, within the engine as a reduction in input torque, and within the electric machine as a reduction in electric machine torque, must balance the reaction times of the torque generative devices of the powertrain in order to simultaneously affect changes to output torque and to maintain the torque capacity of the clutch above the applied reactive torque. Reductions in torque capacity of a clutch are controlled by a commanded torque from the clutch control system. Reaction time within a clutch to changes in commanded torque is impacted by a number of factors, including the particulars of the clutch design and the control method of the clutch control system. In the exemplary embodiment of the clutch control system described above, utilizing a hydraulic system to exert clamping force within the clutches, contributors to reaction time include time required to activate solenoids and valves controlling hydraulic pressures and time required for hydraulic flow in the hydraulic medium to propagate through connected circuits.

While a method can be utilized to perform the reductions associated with an unlocking state in sequential operations, with the torque capacity being the last parameter to be reduced, time involved in an unlocking transition is also important to drivability. Therefore, it is advantageous to perform associated reductions in an unlocking state in parallel while still acting to prevent slip.

When implementing the above described method to prevent slip through an unlocking state, reaction times of the various hybrid drive components to an initiation of the unlocking state must be compared, and the torque capacity of the clutch must be maintained at a minimum level adequately above reactive torque levels to prevent slip until the reaction times of the torque producing components are accommodated through a lead period sufficient to allow for the reduction of reactive torque in the clutch. During the unlocking state, the minimum level of torque capacity necessary to prevent slip can be set to some value just exceeding the estimated level of reactive torque transmitted through the clutch. However, reactive torque transmitted through the clutch and torque capacity resulting from a clutch torque command are both estimated values that cannot be measured directly during vehicle operation. In order to account for variances in either torque capacity or reactive torque, a safety margin or offset value can be used to maintain the torque capacity above the reactive torque. Therefore, preventing clutch slip according the described method can be accomplished in one exemplary embodiment by maintaining torque capacity above reactive torque transmitted through the clutch by at least an offset value calibrated to the particular reaction times within the hybrid drive system.

Figure 5:
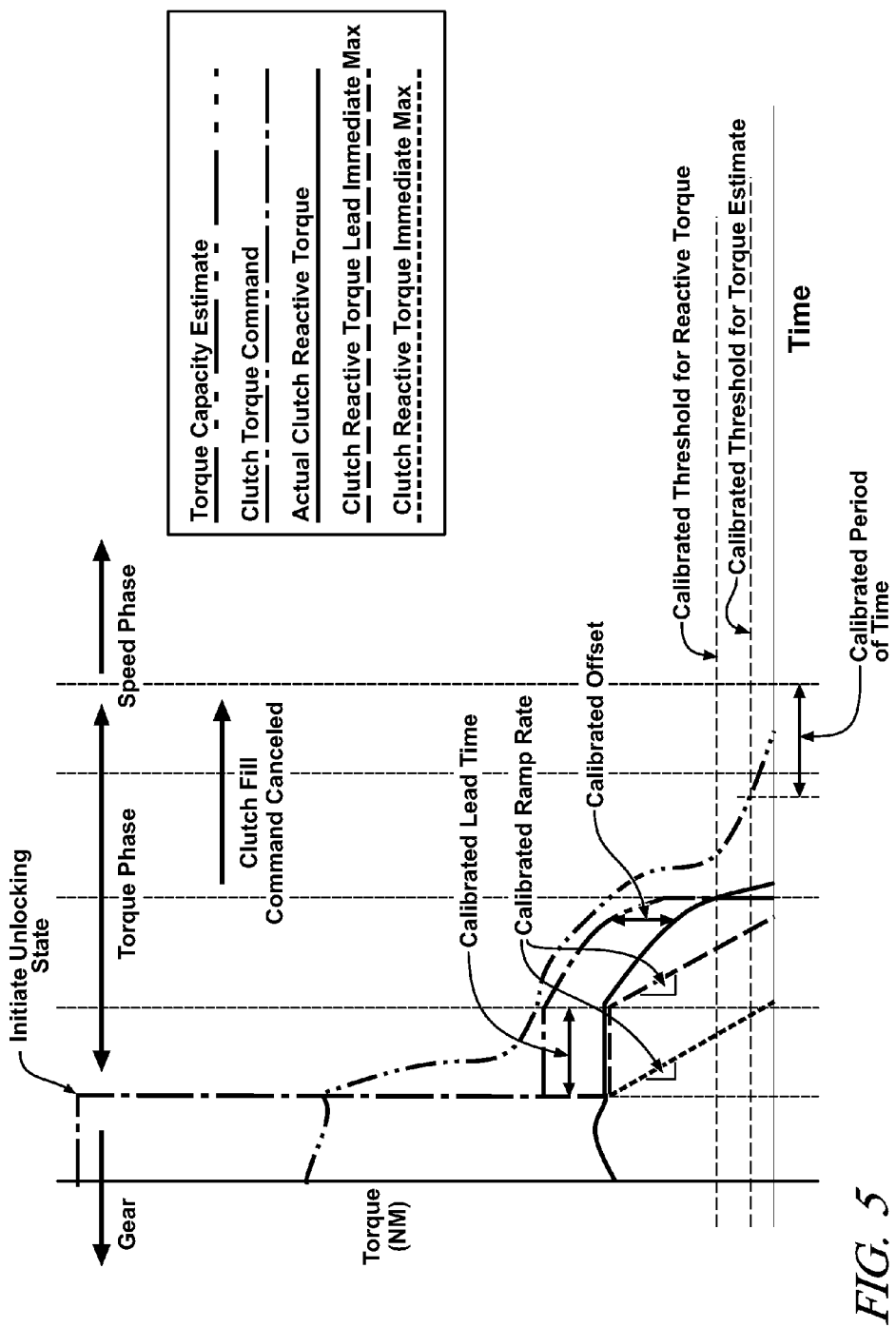
FIG. 5 is a graphical representation of torque terms associated with a clutch through an exemplary transitional unlocking state, in accordance with the present disclosure.

FIG. 5 is a graphical representation of torque terms associated with a clutch through an exemplary transitional unlocking state in accordance with the present disclosure. Lines illustrated at the left extreme of the graph depict clutch operation in a locked state. The graph depicts clutch torque command by the clutch control system and a resulting torque capacity estimate. Clutch torque command is a value requested by the clutch control system. Torque capacity estimate in a clutch resulting from a commanded torque is a result of many factors, including available clamping pressure, design and conditional factors of the clutch, reaction time in the clutch to changes in the clutch control system. As demonstrated in the exemplary data of the graph in the initial locked region, it is known to command a torque to a locked clutch in excess of the torque capacity estimate and allow the other factors affecting the clutch to determine the resulting actual clutch torque capacity. Also at the left extreme of the graph depicting clutch operation in a locked state, clutch reactive torque estimate transmitted through the clutch as a result of input torque from the engine and electric machine torques is depicted. At the time labeled "Initiate Unlocking State", logic within the clutch control system or the TCM, having determined a need to transition the clutch from locked to unlocked states, changes the clutch torque command to some level lower than the current torque capacity estimate but still higher than the clutch reactive torque estimate currently transmitted through the clutch. At this point, mechanisms within the clutch control system, for example, variable pressure control solenoids within an exemplary hydraulic clutch control system, change settings to modulate the clamping force within the clutch. As a result, torque capacity estimate of the clutch begins to change as the clamping force applied to the clutch changes. As discussed above, the clutch reacts to a change in clutch torque command over a reaction time, and reaction time for a particular clutch will depend upon the particulars of the application. In the exemplary graph of FIG. 5, torque capacity estimate reacts to a reduction in commanded torque and begins to reduce accordingly.

As mentioned above, during the same unlocking state, clutch reactive torque resulting from input torque and electric machine torques must also be unloaded from the clutch. Undesirable slip results if the reactive torque is not maintained below the torque capacity throughout the unlocking state. Upon initiation of the unlocking state, at substantially the same point on FIG. 5 where the clutch torque command is reduced to initiate the unlocking state, limits are initiated upon input torque in the form of a clutch reactive torque lead immediate maximum override. Additionally, a clutch reactive torque immediate maximum override is implemented, controlling electric machine torque to both constrain electric machine torque and to utilize the quick reaction time of the electric machines to additionally constrain input torque from the engine, if needed to keep clutch reactive torque estimate below the torque capacity estimate. These limits to input torque from the engine and electric machine torques can be imposed at the same time, with the respective components reacting individually to the changes in commands. However, as described above, coordinating the reactions of the engine and electric machines within the hybrid drive system results in a smoother transition, resulting in a steady reduction in reactive torque transmitted through the clutch.

An application of limits upon the input and electric machine torques through a transitional unlocking event can be seen in FIG. 5, illustrating the clutch reactive torque lead immediate maximum override and, separated by a lead period from the clutch reactive torque immediate maximum override. These maximum values represent the maximum torque that is permitted to be commanded to the clutch from each torque providing device. During the lead period, after the input torque command through the clutch reactive torque lead immediate maximum override has been issued to reduce torque from the engine, in order to provide as stable of an unlocking state as possible, a command through the clutch reactive torque immediate maximum override is issued to limit the electric machine torque to no more than the clutch reactive torque estimate at the initiation of the unlocking state. The input torque and electric machine torque or torques together provide, each up to the defined maximum values, the portion of the powertrain torque demand assigned to the clutch, described by the clutch reactive torque estimate. Recalling that the lines indicated for clutch reactive torque lead immediate maximum override and clutch reactive torque immediate maximum override illustrate the commands and not the actual changes in torque, the ramping down of input torque command by the clutch reactive torque lead immediate maximum override, depicted on the chart before the ramping down of electric machine torque command by the clutch reactive torque immediate maximum override, illustrates necessary lead period between the reducing commands in order to enact substantially simultaneous reductions in reactive torque. The clutch reactive torque lead immediate maximum is ramped down in lead period, and the clutch reactive torque immediate maximum is ramped down in a second period following the lead period. As a result of the calibrated lead period, both the clutch reactive torque lead immediate maximum override and the clutch reactive torque immediate maximum override reduce applied reactive torque to the clutch at substantially the same time, resulting in the reduction to the actual clutch reactive torque as illustrated in FIG. 5.

As described above, the initial reduction in clutch torque command to some level above the actual clutch reactive torque initiates a reduction in torque capacity estimate, to some intermediate level lower than the maximum torque capacity utilized in a locked state, in preparation to reduce the torque capacity estimate to zero to complete the transition to the unlocked state. As the above described process is utilized to reduce reactive torque transmitted through the clutch, initiating a lead period calibrated to the reaction time of the engine to torque commands, the commanded clutch torque remains steadily above the actual clutch reactive torque in order to eliminate potential for slip. The above exemplary process maintains the clutch reactive torque immediate maximum override through the lead period. However, even if, as a result of some control function, the electric machine torque is not maintained through the lead period and is instead reduced at the initiation of the unlocking state, the input torque from the engine can still vary or remain at a higher level until the lead period elapses and the reductions in commands to the engine take effect. Once the lead period has run, and the reactive torque has started to ramp down to zero, the clutch torque command may also be reduced to zero. In the period in which both the clutch reactive torque and the commanded torque are reducing, resulting ramp rates must be selected, calibrated to the particular hybrid drive application, to insure that the torque capacity estimate remains higher than the clutch reactive torque estimate throughout the remainder of the unlocking state. One method to safeguard the ramp rates and prevent slip is to set the clutch torque command to be no smaller than the clutch reactive torque estimate until the clutch reactive torque estimate drops below a particular threshold, as is demonstrated by the horizontal calibrated threshold for reactive torque depicted in FIG. 5. Another method to safeguard the ramp rates and prevent slip is set the clutch torque command according to either the clutch reactive torque immediate maximum override or the clutch reactive torque estimate, requiring the clutch torque command to exceed either value by a calibrated ramp offset value.

Figure 6:
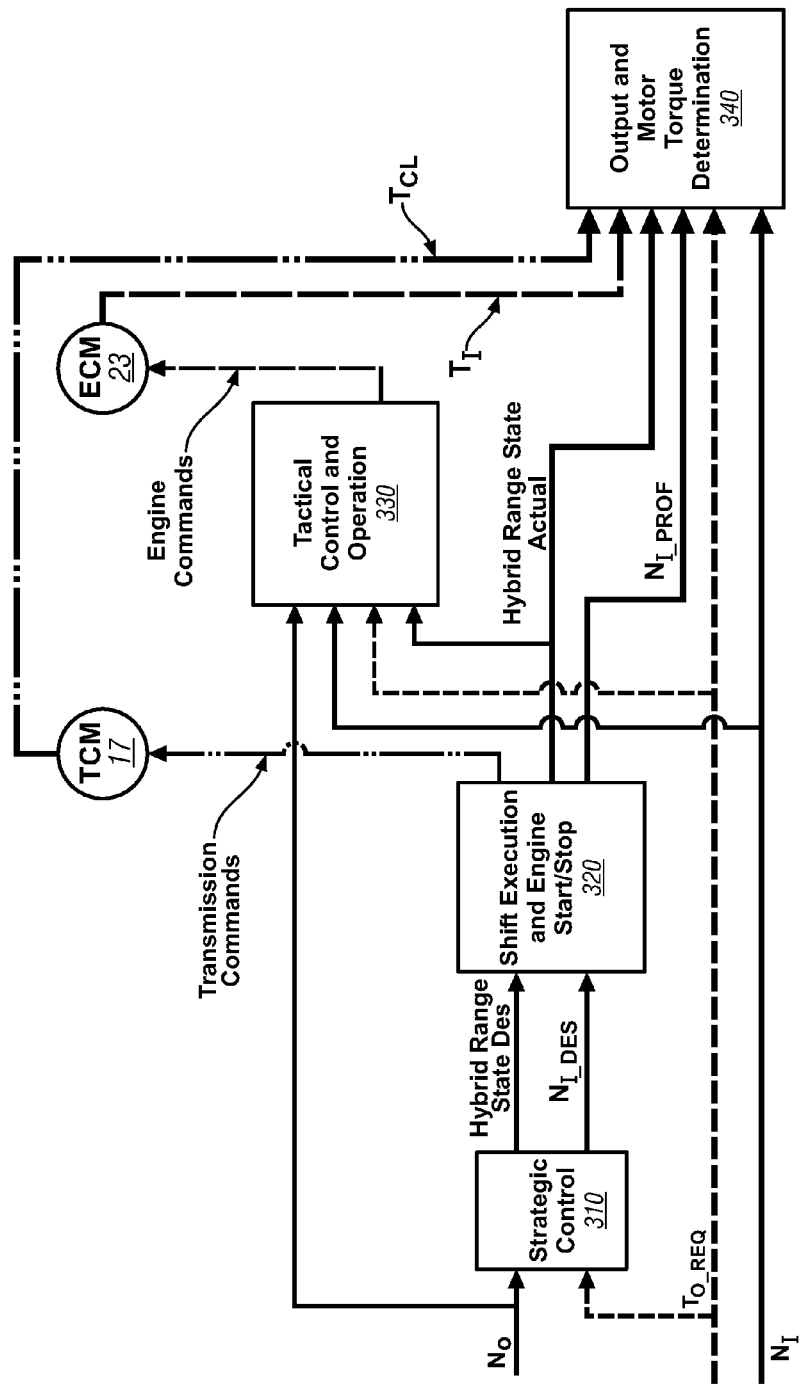
FIG. 6 shows an exemplary control system architecture for controlling and managing torque and power flow in a powertrain system having multiple torque generative devices and residing in control modules in the form of executable algorithms and calibrations, in accordance with the present disclosure.

FIG. 6 shows a control system architecture for controlling and managing torque and power flow in a powertrain system having multiple torque generative devices, described hereinbelow with reference to the hybrid powertrain system shown in FIGS. 1 and 2, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIG. 6 depicts a flow of pertinent signals through the control modules. In operation, the operator inputs to the accelerator pedal 113 and the brake pedal 112 are monitored to determine the operator torque request ('$T_{O\_REQ}$'). Operation of the engine 14 and the transmission 10 are monitored to determine the input speed ('$N_I$') and the output speed ('$N_O$'). A strategic optimization control scheme ('Strategic Control') 310 determines a preferred input speed ('$N_{I\_DES}$') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('$N_{I\_PROF}$') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('$T_{CL}$') for each clutch is estimated in the TCM 17, including the presently applied clutches and the non-applied clutches, and a present engine input torque ('$T_I$') reacting with the input member 12 is determined in the ECM 23. A motor torque control scheme ('Output and Motor Torque Determination') 340 is executed to determine the preferred output torque from the powertrain ('$T_{O\_CMD}$'), which includes motor torque commands ('$T_A$', '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the TPIM 19 to meet the preferred motor torque commands based upon the preferred output torque. The motor torque control scheme 340 includes algorithmic code which is regularly executed during the 6.25 ms and 12.5 ms loop cycles to determine the preferred motor torque commands.

Figure 7B:
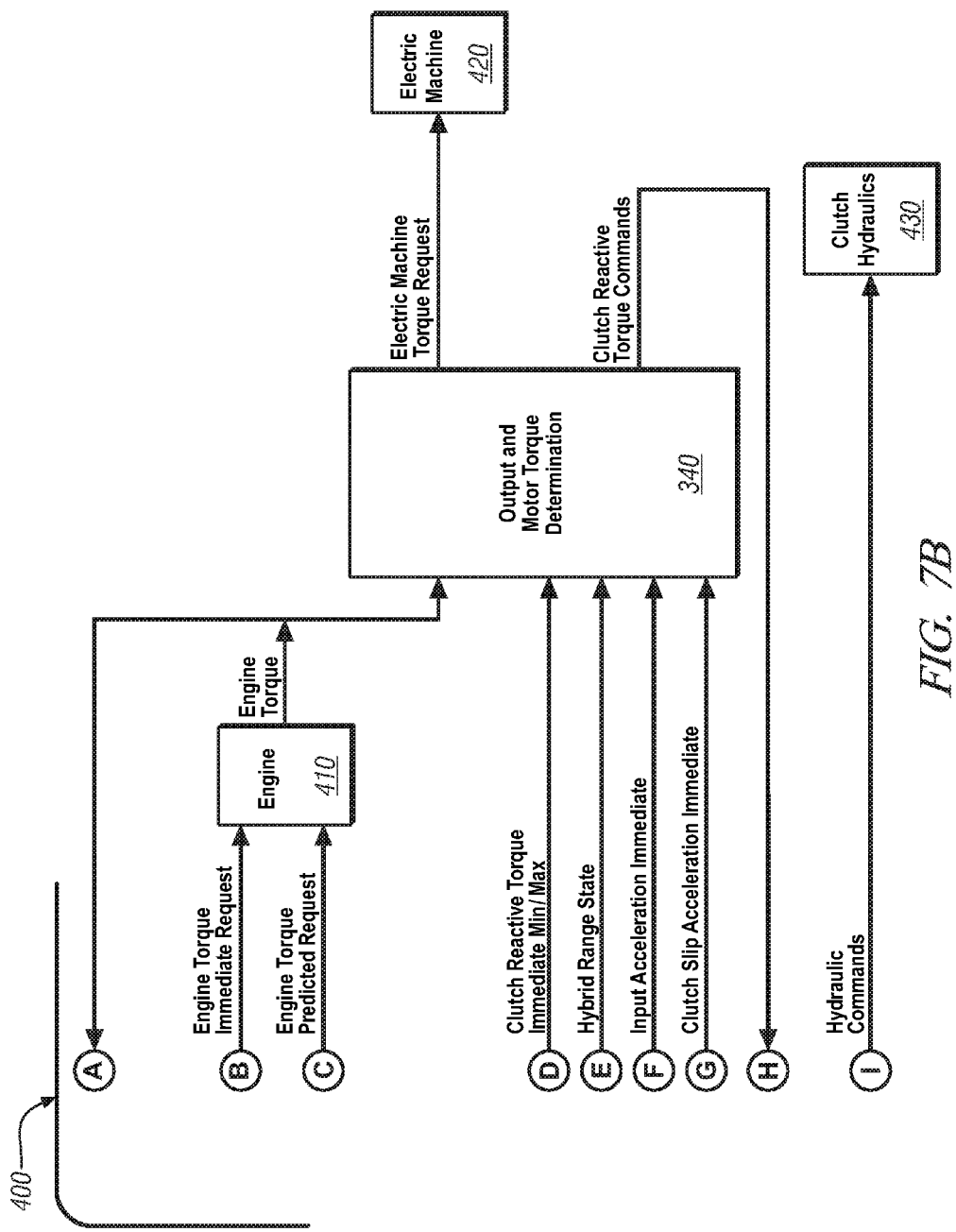
FIG. 7 is a schematic diagram exemplifying data flow through a shift execution, describing more detail exemplary execution of the control system architecture of FIG. 6 in greater detail, in accordance with the present disclosure.

FIG. 7 is a schematic diagram exemplifying data flow through a shift execution, describing more detail exemplary execution of the control system architecture such as the system of FIG. 6 in greater detail, in accordance with the present disclosure. Powertrain control system 400 is illustrated comprising several hybrid drive components, including an engine 410, an electric machine 420, and clutch hydraulics 430. Control modules strategic control module 310, shift execution module 450, clutch capacity control module 460, tactical control and operation module 330, output and motor torque determination module 340, and clutch control module 490, are illustrated, processing information and issuing control commands to engine 410, electric machine 420, and clutch hydraulics 430. These control modules can be physically separate, can be grouped together in a number of different control devices, or can be entirely performed within a single physical control device. Module 310, a strategic control module, performs determinations regarding preferred powertrain operating points and preferred operating range states as described in FIG. 6. Module 450, a shift execution module, receives input from strategic control module 310 and other sources regarding shift initiation. Module 450 processes inputs regarding the reactive torque currently applied to the clutch and the preferred operating range state to be transitioned to. Module 450 then employs programming, determining parameters for the execution of the shift, including hybrid range state parameters describing the balance of input torques required of the torque providing devices, details regarding a target input speed and input acceleration lead predicted required to execute the transition to the preferred operating range state, an input acceleration lead immediate as previously described, and clutch reactive torque lead immediate minimum and maximum and clutch reactive torque immediate minimum and maximum values as previously described. From module 450, clutch reactive torque parameters and hybrid range state information are fed to clutch capacity control module 460, lead control parameters and signals are fed to tactical control and operation module 330, and immediate control parameters and signals are fed to output and motor torque determination module 340. Clutch capacity control module 460 processes reactive torque and hybrid range state information and generates logic describing clutch reactive torque limits enabling engine control through module 330, electric machine control through module 340, and clutch control through module 490, in accordance with methods described herein. Tactical control and operation module 330 includes means to issue torque requests and execute limits upon input torque supplied from engine 410, and feed, additionally, describe the input torque supplied from the engine to module 340 for use in control of electric machine 420. Output and motor torque determination module 340 likewise receives and processes information to issue electric machine torque requests to electric machine 420. Additionally, module 340 generates clutch reactive torque commands for use by clutch control module 490. Module 490 processes information from modules 460 and 340 and issues hydraulic commands in order to achieve the required clutch torque capacity required to operate the transmission. This particular embodiment of data flow illustrates one possible exemplary process by which a vehicular torque generative devices and related clutches can be controlled in accordance with the method disclosed herein. It will be appreciated by one having ordinary skill in the art that the particular process employed can vary, and this disclosure is not intended to limited to the particular exemplary embodiment described herein.

Figure 8:
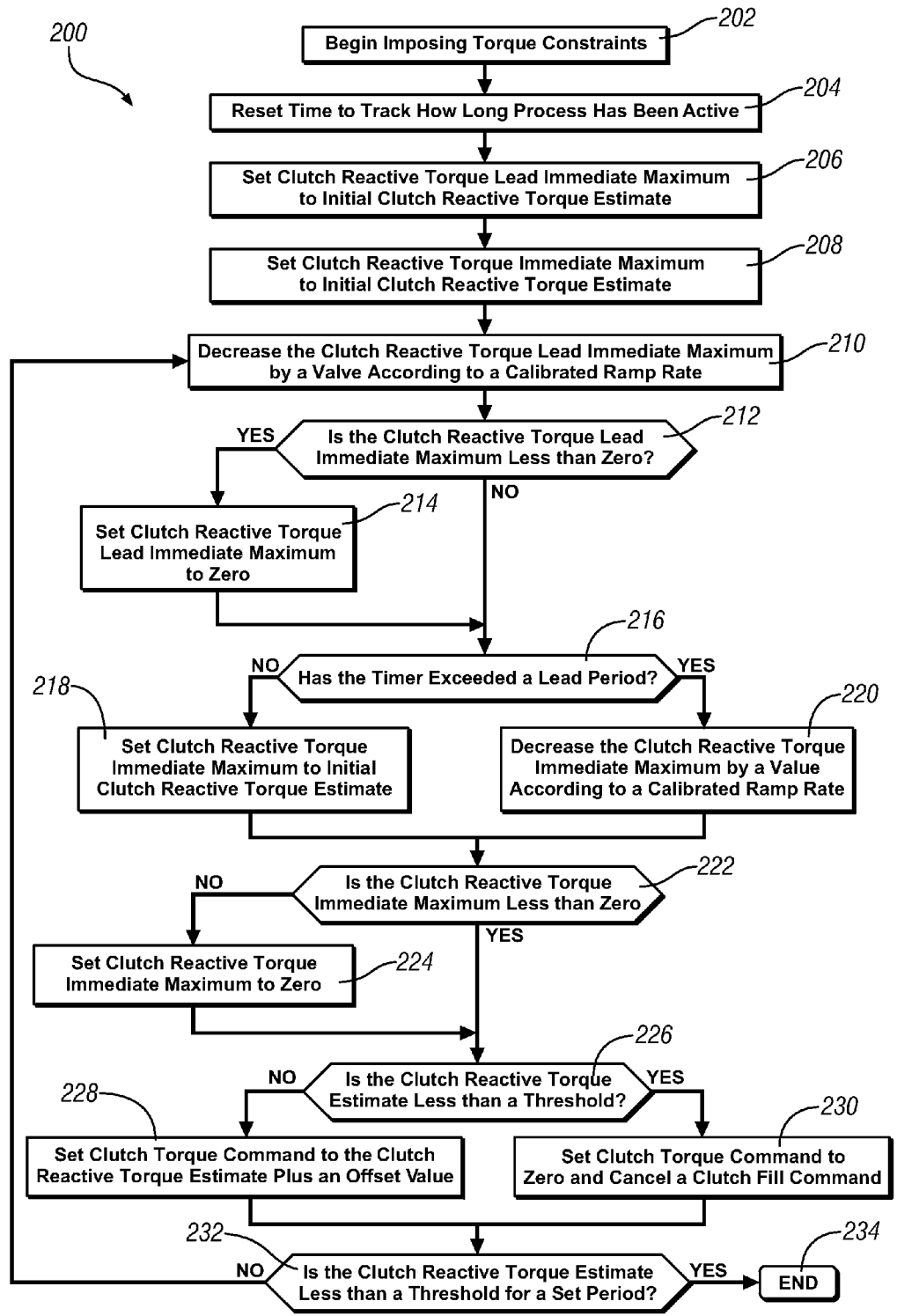
FIG. 8 is a flowchart demonstrating an exemplary process whereby limits may be imposed upon an engine and an electric machine, in accordance with the present disclosure.

FIG. 8 is a flowchart demonstrating an exemplary process whereby limits may be imposed upon an engine and electric machine in accordance with the present disclosure. Through process 200, as illustrated, a clutch reactive torque lead immediate maximum override and a clutch reactive torque immediate maximum override are defined and eventually ramped down to zero for purposes of unloading reactive torque from a clutch. At step 202, the process begins. At step 204, a timer is implemented in order to effect a calibrated delay, as described above, in order to utilize a lead period and coordinate overriding torque commands to the engine. At step 206, the clutch reactive torque lead immediate maximum override is set to an initial clutch reactive torque estimate value calculated at the initiation of the unlocking state. At step 208, similarly to step 206, the clutch reactive torque immediate maximum override is set to the initial clutch reactive torque estimate value. At step 210, the clutch reactive torque lead immediate maximum override is decreased incrementally by a calibrated ramp rate. At step 212, the clutch reactive torque lead immediate maximum override is examined, and if the value is less than zero, then the process proceeds to step 214. If the value is not less than zero, then the process proceeds to step 216. At step 214, the clutch reactive torque lead immediate maximum override, found to be negative at step 212, is set to zero. At step 216, a value from the timer initiated at step 204 is compared to a lead period. If the timer has exceeded the lead period, then the process proceeds to step 220. If the timer has not exceeded the lead period, then the process proceeds to step 218. At step 218, the process still being within the lead period, the clutch reactive torque immediate maximum override is set to the initial clutch reactive torque estimate. Alternatively, at step 220, the process having exceeded the lead period, the clutch reactive torque immediate maximum override is decreased incrementally by a calibrated ramp rate. At step 222, the clutch reactive torque immediate maximum override is examined, and if the value is less than zero, then the process proceeds to step 224. If the value is not less than zero, then the process proceeds to step 226. At step 224, the clutch reactive torque immediate maximum override, found to be negative at step 222, is set to zero. At step 226, the clutch reactive torque estimate is examined, and if the value is less than a threshold, then the process proceeds to step 230. If the value is not less than a threshold, then the process proceeds to step 228. At step 228, the clutch torque command, in an exemplary method to reduce the clutch torque as the clutch reactive torque estimate is being ramped down, is set to the clutch reactive torque estimate plus an offset value. Alternatively, at step 230, the clutch torque command is set to zero and the clutch is substantially commanded to an unlocked state. At step 232, the clutch reactive torque estimate is examined, and if the value is less than a threshold for a set period, then the process is ended. If the value is not less than the threshold or has not been less than the threshold for at least the set period, then the process reiterates to step 210. In this way, the torques transmitted through a clutch in the form of an input torque and an electric machine torque or torques can be limited and ramped down to zero for the purpose of unloading the clutch.

The above method describes a process for transitioning a single clutch from a locked state to an unlocked state. Related methods are envisioned, wherein a plurality of clutches can be substantially simultaneously transitioned, wherein all of the clutch torque capacities are coordinated with an input torque and an electric machine torque or torques to prevent slip, for instance, if a vehicle has been shifted by the operator into a neutral gear state. In such an exemplary application of the above method, each clutch can be individually controlled, with each clutch's torque capacity being maintained in excess of an estimated reactive torque for each clutch through a common lead period calibrated to the response time of the vehicle engine. In the above described method, a strategy to smoothly transition between states is discussed, wherein the clutch reactive torque immediate maximum override is maintained through the lead period in order to reduce both the input torque and the electric machine torque at the same time. However, it will be appreciated by one having ordinary skill in the art that, in relation to a shift into neutral, such a simultaneous reduction of torque is not necessary to preserve drivability. Therefore, in such a shift into neutral, the above method may be used on a clutch or a plurality of clutches, with the clutch reactive torque immediate maximum override being reduced simultaneously to the initiation of the unlocking state, without the above mentioned risk to drivability.

The above method and FIG. 5 describe torque management processes as a comparison of positive values. It will be appreciated by one having ordinary skill in the art that clutch torques are described as positive and negative torques, signifying torques applied in one rotational direction or the other. The above method can be used in either positive or negative torque applications, where the magnitudes of the torques are reduced in such a way that the magnitude of the applied reactive torque does not exceed the magnitude of the torque capacity for a particular clutch.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling an electro-mechanical transmission through an unlocking state of a clutch, the transmission mechanically-operatively coupled to an internal combustion engine and an electric machine adapted to selectively transmit mechanical power to an output member, said method comprising:
   decreasing a reactive torque acting upon said clutch, said decreasing said reactive torque comprising
      overriding torque commands to said engine, and
      overriding torque commands to said electric machine; and
   simultaneously decreasing a clutch torque capacity, comprising
      in a lead period selected according to an engine command reaction time, commanding an intermediate clutch torque command maintaining sufficient clutch torque capacity to exceed an initial reactive torque calculated at an initiation of said unlocking state, and
      in a second period following said lead period, progressively decreasing through a ramp down said clutch torque capacity, said decreasing said clutch torque capacity maintaining sufficient clutch torque capacity to exceed said decreasing reactive torque.

2. The method of claim 1,
   wherein said overriding torque commands to said engine comprises imposing a progressively decreasing limit upon said torque commands to said engine, wherein said imposing said limit upon said commands to said engine ramps down a resulting input torque; and
   wherein overriding said torque commands to said electric machine comprises imposing a progressively decreasing limit upon said torque commands to said electric machine, wherein said imposing said limit upon said commands to said electric machine ramps down a resulting electric machine torque.

3. The method of claim 2, wherein overriding said torque commands to said electric machine further comprises delaying said imposing said progressively decreasing limit upon said torque commands to said electric machine until said second period.

4. The method of claim 3, wherein overriding said torque commands to said electric machine further comprises imposing a fixed limit set at said initial reactive torque upon said torque commands to said electric machine through said lead period.

5. The method of claim 1, wherein commanding an intermediate clutch torque command includes exceeding said initial reactive torque by an offset value.

6. The method of claim 5, wherein exceeding said initial reactive torque by an offset value includes selecting said offset value according to variability between actual reactive torque values and an estimated reactive torque values and variability between actual clutch torque capacity values and estimated clutch torque capacity values.

7. The method of claim 1, wherein maintaining sufficient clutch torque capacity to exceed said decreasing reactive torque comprises utilizing a clutch torque command not less than said decreasing reactive torque.

8. The method of claim 1, wherein maintaining sufficient clutch torque capacity to exceed said decreasing reactive torque comprises utilizing a clutch torque command not less than said decreasing reactive torque until said decreasing reactive torque is less than a threshold torque value.

9. The method of claim 1, wherein maintaining sufficient clutch torque capacity to exceed said decreasing reactive torque includes exceeding said decreasing reactive torque by an offset value.

10. The method of claim 1, wherein decreasing said reactive torque further comprises overriding torque commands to a second electric machine.

11. Method for controlling an electro-mechanical transmission comprising a clutch and mechanically-operatively coupled to an internal combustion engine and an electric machine adapted to selectively transmit mechanical power to an output member, said method comprising:
   upon initiation of an unlocking state, imposing a clutch reactive torque lead immediate maximum override upon engine torque commands, thereby ramping down, after an engine command response time, an input torque;
   simultaneously imposing through a lead period a clutch reactive torque immediate maximum override upon electric machine torque commands fixed at an initial reactive torque calculated at an initiation of said unlocking state;
   after said lead period, imposing a second clutch reactive torque immediate maximum override upon electric machine torque commands, thereby ramping down an electric machine torque; and
   simultaneously decreasing a clutch torque capacity, comprising through said lead period, maintaining said clutch torque capacity to exceed said initial reactive torque by at least an offset value, and after said lead period, decreasing said clutch torque capacity through a ramp down calibrated to maintain said clutch torque capacity in excess of an estimated reactive torque;

wherein said lead period is calibrated to effect said ramping down said electric machine torque substantially simultaneously to said ramping down said input torque.

12. The method of claim 11, wherein decreasing said clutch torque capacity through a ramp down calibrated to maintain said clutch torque capacity in excess of an estimated reactive torque comprises utilizing a clutch torque command not less than said estimated reactive torque.

13. The method of claim 11, wherein decreasing said clutch torque capacity through a ramp down calibrated to maintain said clutch torque capacity in excess of an estimated reactive torque comprises utilizing a clutch torque command not less than said estimated reactive torque until said estimated reactive torque is less than a threshold torque value.

14. The method of claim 11, wherein decreasing said clutch torque capacity through a ramp down calibrated to maintain said clutch torque capacity in excess of an estimated reactive torque comprises utilizing clutch torque commands calibrated to produce said clutch torque capacity in excess of said estimated reactive torque by an offset value.

15. The method of claim 11, wherein maintaining said clutch torque capacity to exceed said initial reactive torque by at least an offset value includes utilizing an offset value calibrated to produce said clutch torque capacity in excess of said initial reactive torque by a margin at least accounting for variances in an actual reactive torque and in said clutch torque capacity.

16. The method of claim 11, further comprising:
simultaneously imposing through said lead period a clutch reactive torque immediate maximum override upon electric machine torque commands to a second electric machine fixed at said initial reactive torque; and after said lead period, imposing a second clutch reactive torque immediate maximum override upon electric machine torque commands to said second electric machine, thereby ramping down an electric machine torque of said second electric machine.

* * * * *